United States Patent Office 2,933,533
Patented Apr. 19, 1960

2,933,533

SUBSTITUTED RESORCINOL AND PROCESS OF PREPARING

David A. Gordon, Midland, Mich., assignor to The Dow Chemical Company, Midland, Mich., a corporation of Delaware No Drawing. Application August 14, 1958
Serial No. 754,926

2 Claims. (Cl. 260—591)

The present invention is directed to a novel compound 2-alyl-4,6-dibenzoyl resorcinol and a method for its preparation. The present compound corresponds to the formula

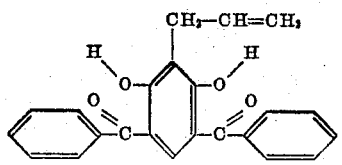

The present compound is a crystalline solid soluble in many common organic solvents such as ethanol, acetone, propanol, and the like, and of very limited solubility in water. It is useful as a parasiticide and is especially adapted to be employed in the control of pathogenic fungi which are parasitic upon plants.

The novel compound is prepared by heating 5-allyloxy-2,4-dibenzoyl phenol, whereby the 5-allyloxy-2,4-dibenzoyl phenol molecule is caused to rearrange, to produce the present compound.

In carrying out the reaction, the 5-allyloxy-2,4-dibenzoyl phenol may be heated while in dispersion in an organic reaction medium such as dimethylaniline, diethylaniline, or a paraffin oil; but in a preferred embodiment, the reaction is carried out in the absence of such medium. The rearrangement reaction takes place over a wide range of temperatures, such as from 100° to 250° C., but a temperature range of 180°–210° C. is preferred as carrying the reaction forward promptly, and obtaining the desired product in good yield. The reaction is mildly exothermic. Preferably, the reaction is carried out in the absence of water, and under blanketing of a gas which does not cause oxidation, such as hydrogen, carbon dioxide, or nitrogen.

Small yields of the desired product are obtained from heating for even very short periods of time, but heating for periods of from 2 to 24 hours assures substantial completion of the rearrangement reaction.

Upon completion of the reaction, the resulting reaction mixture may be dissolved in ethanol, and the desired product recrystallized therefrom to purify it by separation from unrearranged starting material and by-products.

The following examples illustrate the invention but are not to be construed as limiting.

Example 1

5-allyloxy-2,4-dibenzoyl phenol (179.2 grams; 0.5 mole) was heated at 200° C. for 5 hours. At the end of this heating period, the resulting reaction mixture was taken up in hot ethanol, which was thereafter cooled to precipitate a crystalline product. This product was separated by decantation of the supernatant liquid, and the crystallization repeated. As a result of these operations, there was obtained a 2-allyl-4,6-dibenzoyl resorcinol product as a crystalline solid melting at 155°–157° C.

The present compound is useful as a fungicide and is adapted to be employed in the control of plant-parasitic fungi of the family Uredinales. In a representative operation, young wheat plants of a rust-susceptible variety were covered with a wetting spray of a water emulsion of a solvent solution containing the present compound in a concentration of ½ pound per 100 gallons of ultimate composition. Thereafter, the applied spray was allowed to evaporate to dryness on the plants, and the plants were then sprayed with a water suspension of unrediniospores of *Puccinia graminis tritici*. A group of plants used as a check was similarly treated except that the present compound was not employed. After a period of incubation in a warm, moist greenhouse, the untreated plants were uniformly heavily infected with the fungus, whereas the plants treated with present compound showed a substantial degree of protection.

The 5-allyloxy-2,4-dibenzoyl phenol employed as a starting material in the present invention may be prepared by heating a mixture of 4,6-dibenzoyl resorcinol and allyl bromide, dispersed in a liquid reaction medium which may be a reaction solvent such as methylethyl ketone or methanol, in the presence of a hydrogen halide neutralizing agent such as sodium hydroxide or an alkali metal lower alkoxide. The heating is carried out in the temperature range of 50°–100° C., for example at the reflux temperature of the solvent.

To separate the 5-allyloxy-2,4-dibenzoyl phenol from the resulting reaction mixture, the mixture may be dispersed in water, and the water dispersion extracted with diethyl ether, the ether extract further water washed, dried, and ether solvent removed by vaporization. 5-allyloxy-2,4-di-benzoyl phenol melts at 102.5–104.5° C.

I claim:

1. 2-allyl-4,6-dibenzoyl resorcinol.
2. A method of preparing a 2-allyl-4,6-dibenzoyl resorcinol which consists of heating 5-allyloxy-2,4-dibenzoyl phenol at a rearrangement temperature of from 100° to 250° C.

References Cited in the file of this patent

UNITED STATES PATENTS 2,794,052   Gordon et al. _____ May 28, 1957

OTHER REFERENCES

Fuson et al.: J. Am. Chem. Soc., vol. 73, pp. 4980–1 (1951).